US006873730B2

(12) United States Patent
Chen

(10) Patent No.: US 6,873,730 B2
(45) Date of Patent: Mar. 29, 2005

(54) COLOR CONVERSION METHOD FOR PREFERRED COLOR TONES

(75) Inventor: Chun-Yen Chen, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 603 days.

(21) Appl. No.: 10/077,869

(22) Filed: Feb. 20, 2002

(65) Prior Publication Data

US 2003/0086104 A1 May 8, 2003

(30) Foreign Application Priority Data

Nov. 2, 2001 (TW) .......................... 90127225 A

(51) Int. Cl.$^7$ .......................... G06K 9/00; G06K 9/32
(52) U.S. Cl. .......................... 382/167; 382/300
(58) Field of Search .......................... 382/162, 167, 382/181, 193, 197, 199, 272, 300; 358/1.9, 515, 518, 523, 525, 530; 345/589, 600, 603, 604

(56) References Cited

U.S. PATENT DOCUMENTS

| | | | | | |
|---|---|---|---|---|---|
| 6,044,172 A | * | 3/2000 | Allen | .......................... | 382/166 |
| 6,101,272 A | * | 8/2000 | Noguchi | .......................... | 382/167 |
| 6,108,442 A | * | 8/2000 | Edge et al. | .......................... | 382/167 |
| 6,118,549 A | * | 9/2000 | Katougi et al. | .......................... | 358/1.9 |
| 6,266,454 B1 | * | 7/2001 | Kondo | .......................... | 382/300 |
| 6,668,079 B2 | * | 12/2003 | Takemoto | .......................... | 382/167 |
| 6,724,500 B1 | * | 4/2004 | Hains et al. | .......................... | 358/1.9 |
| 6,781,716 B1 | * | 8/2004 | Yoda | .......................... | 358/1.9 |
| 6,791,712 B1 | * | 9/2004 | Gerrits | .......................... | 358/1.9 |
| 6,807,296 B2 | * | 10/2004 | Mishima | .......................... | 382/162 |

* cited by examiner

*Primary Examiner*—Andrew W. Johns
*Assistant Examiner*—Amir Alavi
(74) *Attorney, Agent, or Firm*—Birch, Stewart, Kolasch & Birch, LLP

(57) ABSTRACT

A color conversion method for preferred color tones to change original color in a color image into a preferred one. The invention first sets chromaticity of the selecting original color and corresponding preferred color, then takes them as the basic points to establish a tone action space of the two color according to a color tone action distance. The two spaces are then joined to form a color conversion space and to determine a vector from the original color to the preferred color for converting the colors in the color conversion space into the new color. Finally, the color conversions from the original color to the new color are made to generate a new color image with the preferred color tone. The invention only converts the original colors in the color conversion space into new colors to get a new color image with preferred color tones. The selecting original color and corresponding preferred color pair can be plural in the invention.

7 Claims, 12 Drawing Sheets

COLOR CONVERSION METHOD FOR PREFERRED COLOR TONES

BACKGROUND OF THE INVENTION

1. Field of Invention

The invention relates to a color conversion method used for preferred color tone processing in color images.

2. Related Art

The quality of color images obtained from currently available input devices (digital cameras, scanners and computer graphics devices) is not perfect. Therefore, these color images need to be further processed to improve the color quality. Two major purposes of doing this are: (1) through color calibrations and corrections, the colors in obtained color images are closer to true colors, which called color reproduction; and (2) the colors are changed into the preferred colors. On the other hand, each output device (printer and display) has various rendering color space or color gamut. Furthermore, each person has preferred colors in the color images, such as skin color, sky color, grass color, etc. While using input and output devices, one thus requires good enough cross media color matching. It is therefore desirable to have a color conversion method to change original image color tones to preferred ones.

The so-called color tone refers to visual perception of colors from the chromaticity distribution of an image in color space. For example, images taken under fluorescent light tends to be bluish. Such an image tone is said to cast a blue (or cold) one. Color tone change is shown corresponding relation between the modified color values (chromaticity) and the original color values. For example, in the RGB (Red, Green, and Blue) color space, if all color values of every pixel in an image are multiplied by a factor of 1.2 the image becomes brighter. In addition, if all red (R) values of every pixel in an image are multiplied by 1.2 in RGB color space, then the image becomes reddish.

Conventional processing methods of preferred color tones include adjusting the tone curve, hue, saturation or brightness. Nevertheless, these methods result in changing chromaticity of all colors in the whole color space.

To improve this situation, another method of chromaticity interpolating in the color space has been developed. This method divides the whole color space into a space comprised of several cubes. There is a 3-direction look-up table (LUT) between the original chromaticity and the preferred chromaticity for the conversion. The conversion method of using this LUT is shown in FIG. 1. First, the color $K_1$ in the original color image (whose color space is TUVO) is converted into another preferred color $k_1$ and $K_2$ to $k_{21}$. The chromaticity of boundary colors (colors on the lines connecting T, U, V, and O) in the original color image is fixed. Other colors are obtained by interpolation. For example, $K_4$ is moved to $k_4$, $K_5$ is moved to $k_5$, and $K_3=k_3$ because the boundary colors are unchanged. However, if the color M and color N are fixed colors, then the colors on the line segment MN become boundary colors. Since the preferred color $k_{21}$ goes beyond the boundary color (segment MN), the new color $k_{21}$ will be set as a boundary color $k_{22}$ and $K_5$ is fixed to $k_{52}$. In other words, the preferred colors and new colors are calculated by interpolation cannot exceed the boundary colors (MN) defined by connecting the fixed colors. This makes color conversion of preferred color tones unfeasible. Therefore, using this method will result in the following problems:

1. One usually only need to make preferred color conversions to particular colors and its surrounding colors. That is, only the colors in this specific area need to be converted. However, the above-mentioned method makes color conversions for the whole color space. This does not only complicate the preferred color processing and slow down the conversion speed; colors that do not need to be changed are also converted, resulting in uncontrollable preferred color processing.
2. The variation of colors has to be gradient changed around the selecting preferred color and therefore should not be restricted by the limitation of fixed colors. Such limitations may result in unnatural colors.
3. When making preferred color conversions, the relative of each color within an area around the selecting preferred color one should be maintained, allowing for continuous and smooth color variation. However, the previously mentioned method cannot achieve this purpose.
4. As the vector of preferred colors cross with fixed color connection lines (e.g. color $K_2$ becoming color $k_{21}$), the previous method cannot perform color conversions for the preferred colors. This situation of preferred color conversion, however, is occurred frequently and very important in practice.

SUMMARY OF THE INVENTION

An objective of the invention is to provide a color conversion method for preferred color tone processing. The method converts colors in a color image that one wants to change, and then get a preferred color tone image. It can increase the color conversion speed and have improved control over preferred color tone processing.

In accordance with the disclosed color conversion method, an original color tone in a color image is converted into a preferred one. After setting the model of a tone action distance and a tone action space, this method performs the following steps. First, a desired original color in an original color image and the corresponding preferred color are set in the color space. The selecting original color and preferred color are taken as the basis to build the three-dimensional tone action spaces according to the tone action distance. The tone action spaces formed from the original and preferred colors are joined to form a color conversion space, determining a vector from the original color to the preferred color. The color conversion is then performed according to the vector to generate new color. In accordance with the correspondence relations between the original color and the new color, the color image is converted into a new color image with the preferred color tone.

For a color image, if there are several desired original colors and the corresponding preferred colors will be converted, the invention can also simultaneously establish several color conversion spaces to perform preferred color conversions. If any intersection among these color conversion spaces is occurred, then the average value (the average of chromaticity of preferred colors in different color conversion spaces) is taken as the new chromaticity of that preferred color. In this case, the step of confirming the intersection of these color conversion spaces is added after the step of generating a new color. If the intersection is not occurred, the color image is converted directly to produce a color image with preferred color tone. If there is any intersection, then the new colors in the intersection area are calculated previously. The image color is converted afterwards to the preferred color tone.

DETAILED DESCRIPTION OF THE INVENTION

Figure 1:
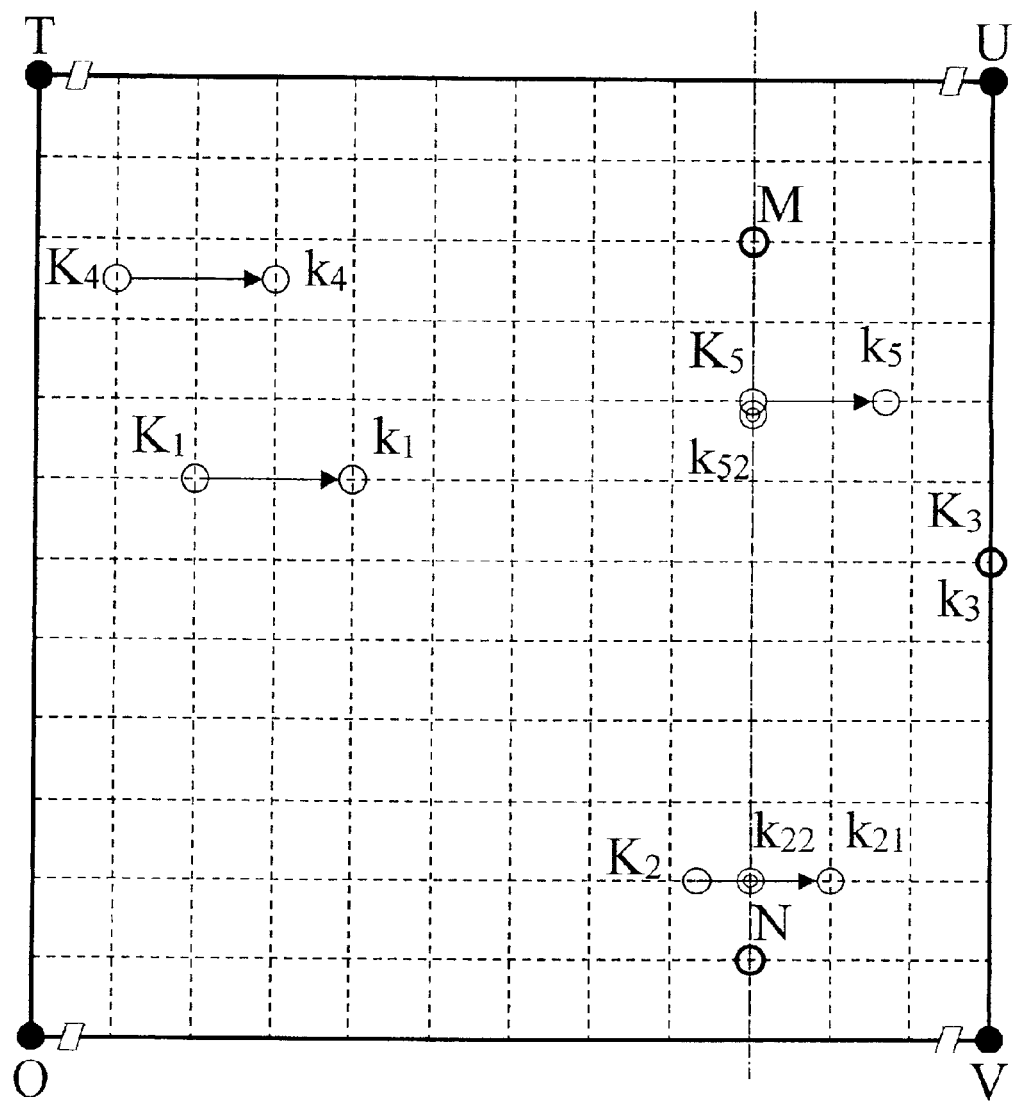
FIG. 1 is a schematic view of a conventional color tone conversion method.

Before the detailed description of the invention, we must first define the following terms:

1. Original color: this refers to the original chromaticity (color value) of a desired color selected in the color image. This color is taken as the reference point (basic point) in a color tone action space to perform color conversions to a preferred color tone.
2. Preferred color: this refers to the chromaticity (color value) of a preferred color converted from the original chromaticity of a color selected from the color image. The preferred color and the original color have a one-to-one correspondence relation. Also, this color is taken as the reference point (basic point) in a color tone action space to perform color conversions.
3. Fixed color: this refers to a color whose original chromaticity is the same as the chromaticity of its preferred color. Therefore, during the color conversion processing, this color is held fixed.
4. Color space: this space is comprised of all colors during the color conversion processing.
5. Boundary color: this refers to the chromaticity of any color on the boundary of the color space. During the color conversion to preferred color tone, the boundary colors are fixed.
6. Color tone: the performing of the chromaticity (color value) of all color of a color image in a color space. Then the color tone is referred to the visual perception of such a chromaticity distribution of the color image.
7. Original tone: this refers to the visual perception of the original chromaticity distribution of an unconverted color image. That is, the original tone is the color presentation of the original color image.
8. Preferred color tone: this refers to the visual perception of the preferred chromaticity distribution of a preferred color tone image after convert processing. That is, the preferred color tone is the color presentation of the preferred color image with preferred colors converted from the original colors.
9. Color tone action space: this is a three-dimensional color tone action space established based upon the basis colors (original color, preferred color, and fixed color). The invention uses this three-dimensional space as the standard processing area for color conversions. On the other hand, although the color tone action space uses a color as its basic point, such a space can be either symmetric or asymmetric.
10. Color tone action distance: this refers to a color is taken as the basis to establish the color tone action space by the color tone action distance. It can be a constant or a variable value, depending upon the type of color tone action space. It is counted in terms of the color unit. For example, when the color tone action space is spherical, the color tone action distance is the radius. When the color tone action space is a cube, the color tone action distance is the color block. When the color tone action space is an ellipse, the color tone action distance varies with the angle.
11. Color conversion space: this is the color space used for converting the chromaticity of an original color tone to the chromaticity of a preferred color tone.
12. Vector: in the color space, the vector contains the distance and direction from the chromaticity of original color to the chromaticity of preferred color.
13. New color: the chromaticity in the color conversion space after the color conversion process is the new color. Of course, for a fixed color, there is no conversion, since the chromaticity of its original color, preferred color, and new color are the same. When there is null intersection among all color conversion spaces, the new color is the preferred color. However, as the intersection is occurred among the color conversion spaces, the new color of anyone color conversion space is not the same as the preferred color, but is the average of the preferred colors of the color conversion spaces that intersect each other.

Figure 2:
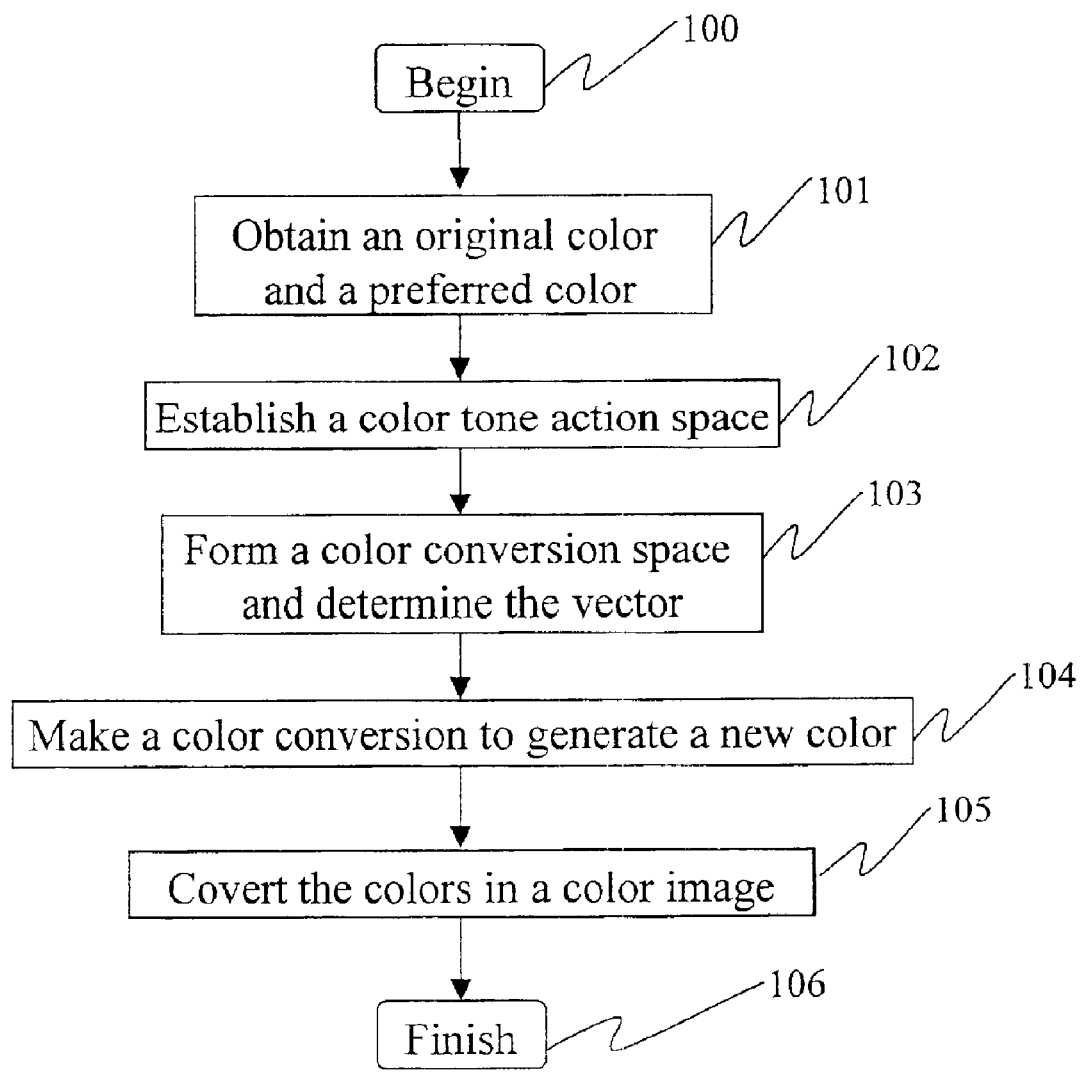
FIG. 2 lists a procedure of the invention.

As shown in FIG. 2, the disclosed color conversion method is used for color conversions in color images. According to this method, an original color in an original color image and the corresponding preferred color are selected in a color space. Both chromaticity of original color and preferred color are taken as the basic points of color tone action space. After the models of a color tone action distance and a color action space are set, the color conversion method involves the following steps:

First, beginning the method (step 100). Then, a desired original color and a preferred color are set. The desired chromaticity corresponding to the original color tone and the preferred color tone are selected in the color space (step 101). Afterwards, a color tone action space is established, using the chromaticity of original color and the preferred color as the basic points. The color tone action distance is taken as the distance to establish a three-dimensional color tone action space of the colors (step 102). Both the color tone action space and the color tone action distance can be set by the user in advance or they can be set as default values. The established color tone action space can be a rectangular, spherical, cylindrical, elliptical, or polygon space, or one similar to the above-mentioned models. On the other hand, although the color tone action space uses a selected color as the basic point basis, it is not necessary to take this color as the center to build the space.

In step 103, a color conversion space along with a vector are formed. Joining the color action spaces of the original color and the preferred color along with vector forms a color conversion space. The vector is a line from the chromaticity of original color to the chromaticity of preferred color. That is, the color conversion space covers the area of two individual color action spaces formed by the colors (original and preferred colors) and enclosed area of the line segment between the two color action spaces. This color conversion space is formed with reference to the boundary of the color space.

In step 104, a new color is generated through the color conversion. The conversion is processed according to the vector in the color conversion space. Interpolation or color adjustment is used in the color space to convert the original colors in the color conversion space into the preferred colors. The preferred color is the new color.

Afterwards, converting the chromaticity of all color in the color image utilizes the correspondence relation between the original color and the new color, changing the color of the original color image into preferred color to get a new color image with preferred color tone (step 105). Finally, step 106 finishes the method.

Figure 3:
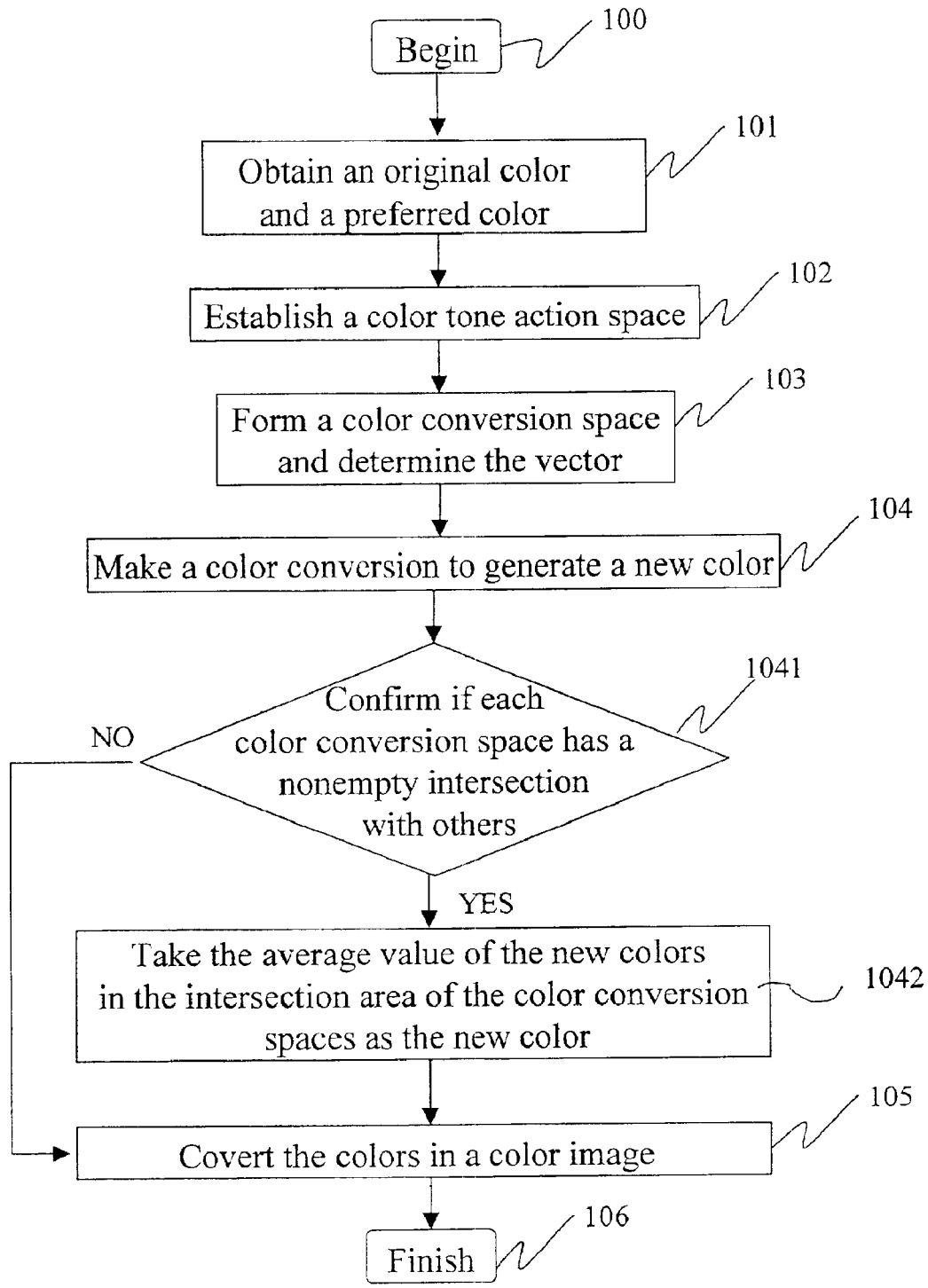
FIG. 3 lists another procedure of the invention.

Of course, the number can be selected of the original color and the corresponding preferred color is not limited to one. When there is a plurality of original colors and preferred colors, as shown in FIG. 3, the step of confirming whether the intersection was occurred among the color conversion spaces formed by the original colors and the corresponding preferred colors is added after step 104 to further calculate the new colors. The detailed steps are as follows:

Step 1041 confirms whether any intersection was occurred among the color conversion spaces. If there is no intersection, the correspondence relations between the original colors and the new colors are employed to perform color conversions on a color image, creating a new color image with the preferred color tone (step 105). If the intersection is occurred, step 1042 calculates the new chromaticity of the colors in the intersection area. This step obtains the average chromaticity (color value) of the new colors in the color conversion spaces. The average chromaticity is taken as the new one of the new color in the intersection area to perform step 105. In practice, it is first confirmed whether each color conversion space contains the preferred colors of other color conversion spaces or not. The step of calculating the new color in the intersection area is still performed no matter what the result is. If one color conversion space indeed contains the preferred colors of other color conversion spaces, the method suggests re-selecting an original color, a preferred color, and a color tone action space. However, this suggestion procedure is not a necessary condition of the invention.

When the chromaticity of original color is the same as the preferred color one, this color is a fixed color. Since the color conversion space of the fixed color is the same as its color tone action space, this is a null vector. Therefore, the color inside the color tone action space of the fixed color (also the color conversion space) is not changed no matter whether the space is converted or not.

Figure 4A:
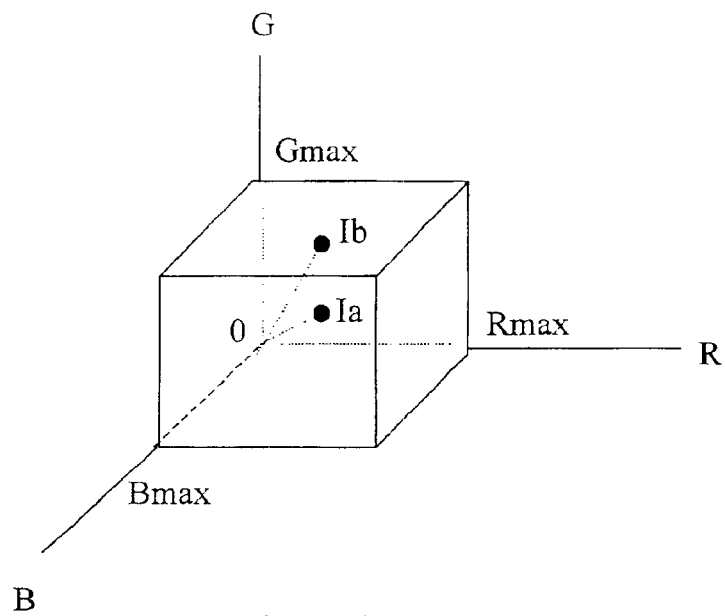
FIGS. 4A, 4B and 4C are schematic views of the colors Ia and Ib on the RG and RB planar color spaces of the RGB three-dimensional space.
Figure 4B:
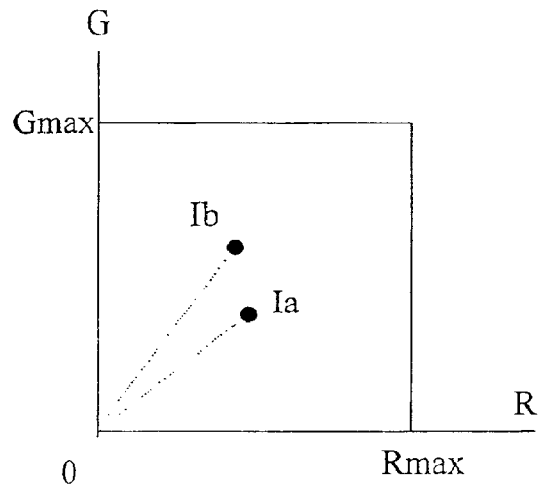
Figure 4C:
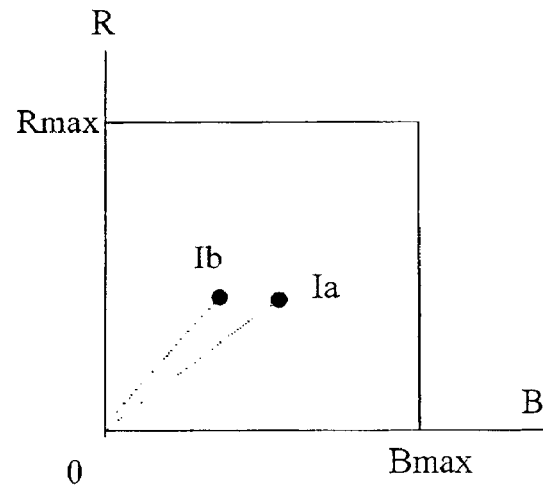

In FIGS. 5 through 8D, the chessboard-like areas represent a color space. The thick solid lines around them are the boundaries of the color space. Each small block enclosed by the thin dashed lines is a color unit. The areas enclosed by the thick dotted lines form the color tone action space. The areas enclosed by the thin solid lines form the color conversion space. In actuality, such spaces are three-dimensional, as shown in FIGS. 4A, 4B, and 4C. Since the colors Ia and Ib in an RGB three-dimensional color space can be separated into RG and RB planar color spaces, the three-dimensional relations among these spaces are the same as the planer ones. Therefore, we use the planar one to explain the contents of the invention.

Figure 5:
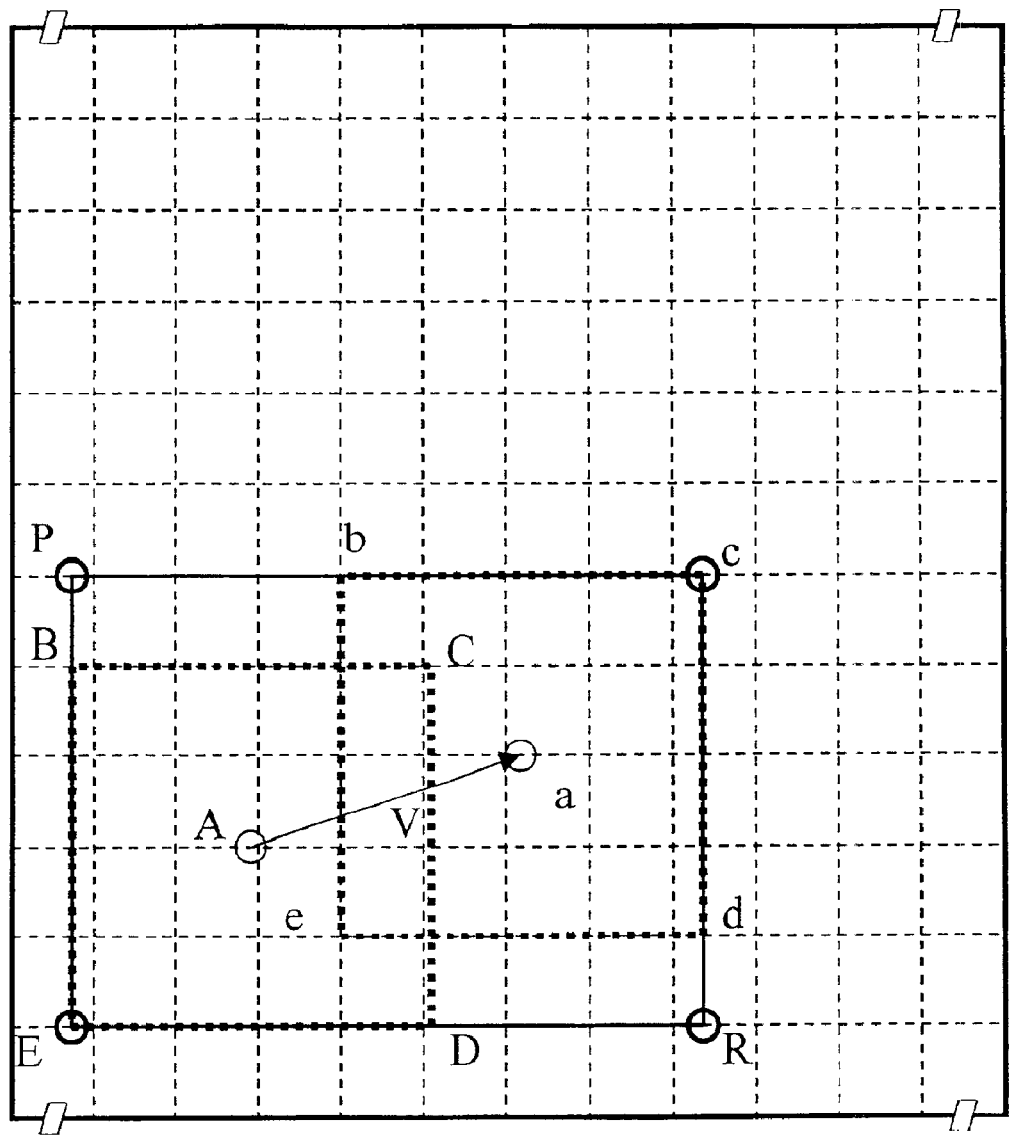
FIGS. 5 through 8D are schematic views of color conversions of original, preferred and fixed colors according to the invention.

As shown in FIG. 5, when converting an original color "A" into a preferred color "a", and the color tone action distance is ±2 color units. The colors "A" and "a" are taken as the centers, and the color tone action distance are taken as the range, to form color tone action spaces "BCDE" and "bcde". The two spaces "BCDE" and "bcde" are joined to form a color conversion space "PcRE". Using the vector from the color "A" to the color "a", each color in the color conversion space "PcRE" is converted into a new color using interpolation or color tone adjustment. This new color is used for color conversion of a color image to get a new image with preferred color tone.

Figure 6:
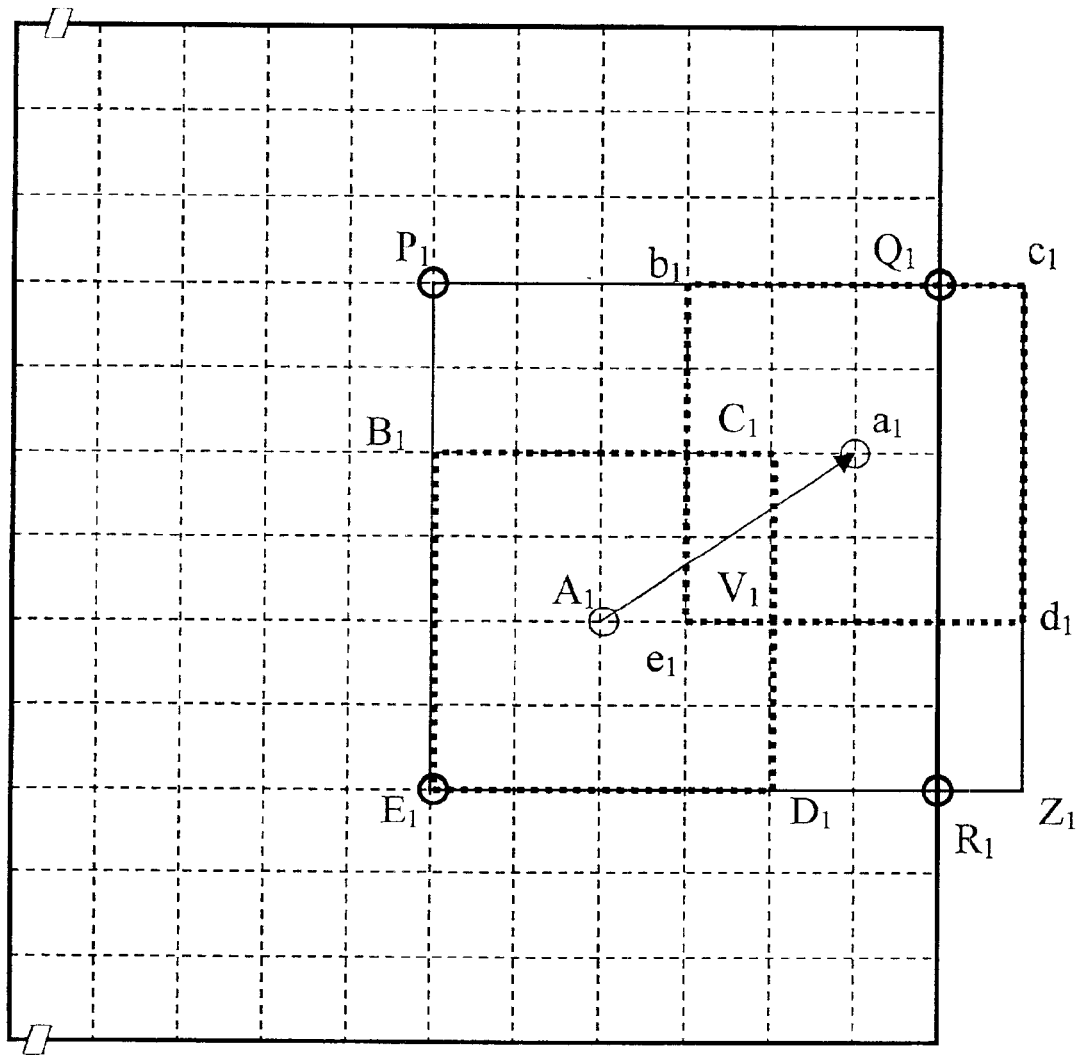

Similarly, as shown in FIG. 6, when converting an original color "$A_1$" into a preferred color "$a_1$" with the color tone action distance being ±2 color units, the colors "$A_1$" and "$a_1$" are taken as the centers, and the color tone action distance are taken as the distance, to form color tone action spaces "$B_1C_1D_1E_1$" and "$b_1c_1d_1e_1$". These two spaces are joined to obtain a color conversion space "$P_1c_1Z_1E_1$". Since this is beyond the color conversion boundary, it is shrunk into a smaller one "$P_1Q_1R_1E_1$". Afterwards, the vector "$V_1$" from the color "$A_1$" to the color "$a_1$" is used to convert the colors within the color conversion space "$P_1Q_1R_1E_1$" by interpolation or color tone adjustment. The new colors thus are gotten by this conversion. Then this new color is used for color conversion of a color image to get a new image with preferred color tone.

Figure 7:
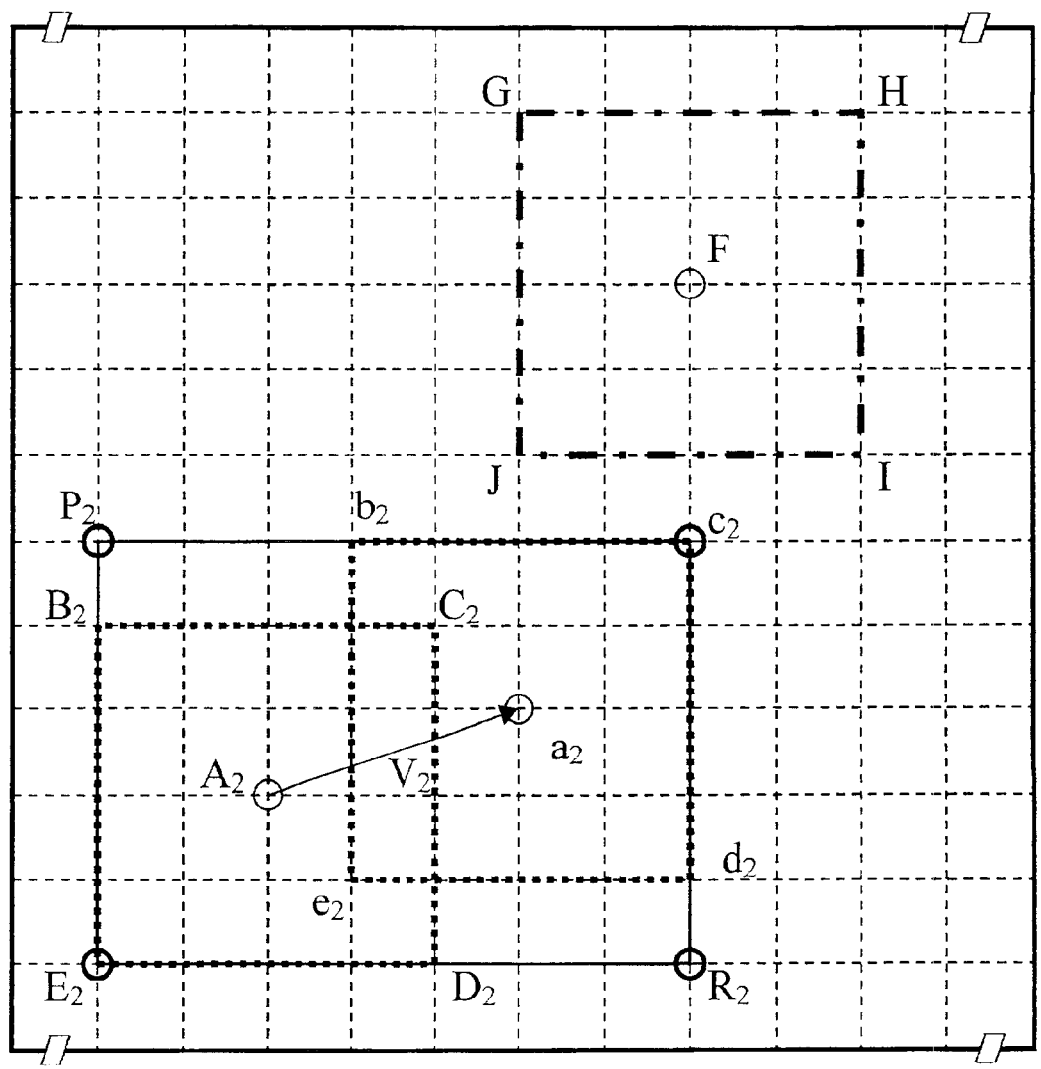

On the other hand, as shown in FIG. 7, when converting an original color "$A_2$" into a preferred color "$a_2$", the fixed color is "F", and the color tone action distance is ±2 color units. The colors "$A_2$", "$a_2$" and "F" are then taken as the centers with the color tone action distance being taken as the range to form color tone action spaces "$B_2C_2D_2E_2$", "$b_2c_2d_2e_2$" and "GHIJ". The spaces "$B_2C_2D_2E_2$" and "$b_2c_2d_2e_2$" are joined to obtain a color conversion space "$P_2c_2R_2E_2$". Afterwards, the vector "$V_2$" from the color "$A_2$" to the color "$a_2$" is used to convert the colors within the color conversion space "$P_2c_2R_2E_2$" by interpolation or color tone adjustment. There is no intersection occurrence between spaces "$P_2c_2R_2E_2$" and "GHIJ". The new color thus obtained is then used to make color conversion of color image.

With reference to FIG. 8, when converting an original color "$A_3$" into a preferred color "$a_3$", the fixed color is "$F_1$", and the color tone action distance is ±2 color units. The colors "$A_2$", "$a_2$" and "$F_1$" are then taken as the centers with the color tone action distance being taken as the range to form color tone action spaces "$B_3C_3D_3E_3$", "$b_3c_3d_3e_3$" and "$G_1H_1I_1J_1$". The spaces "$B_3C_3D_3E_3$" and "$b_3c_3d_3e_3$" are joined to obtain a color conversion space "$P_3c_3R_3E_3$". Afterwards, the vector "$V_3$" from the color "$A_3$" to the color "$a_3$" is used to convert the colors within the color conversion space "$P_3c_3R_3E_3$" by interpolation or color tone adjustment. The intersection is occurred between the spaces "$P_3c_3R_3E_3$" and "$G_1H_1I_1J_1$". Therefore, the intersection area (the area with oblique lines) between the spaces "$P_3c_3R_3E_3$" and "$G_1H_1I_1J_1$" is used to calculate and obtain the average chromaticity of the fixed color and the new color as the new color for this intersection area to perform color conversions.

Figure 8A:
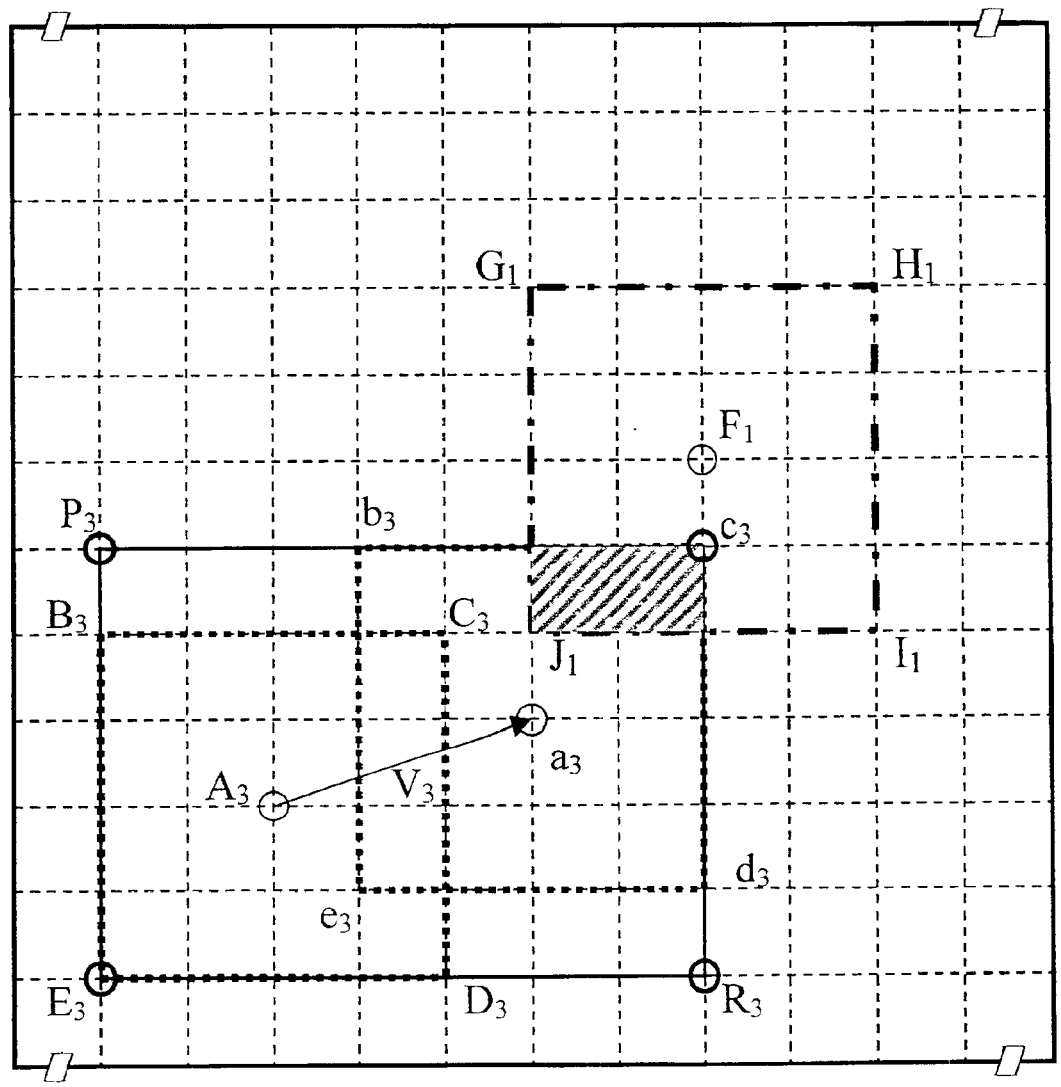
Figure 8B:
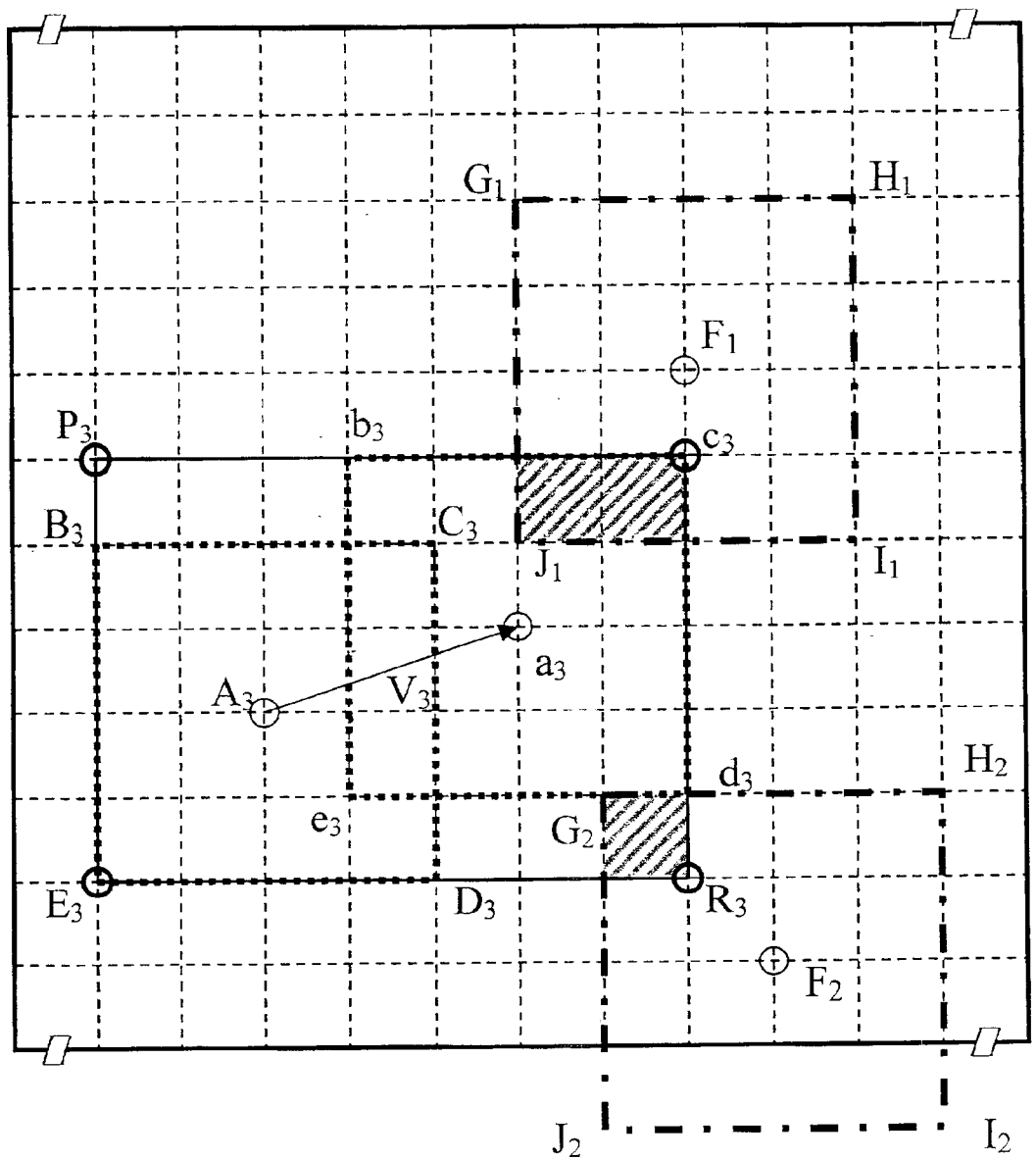
Figure 8C:
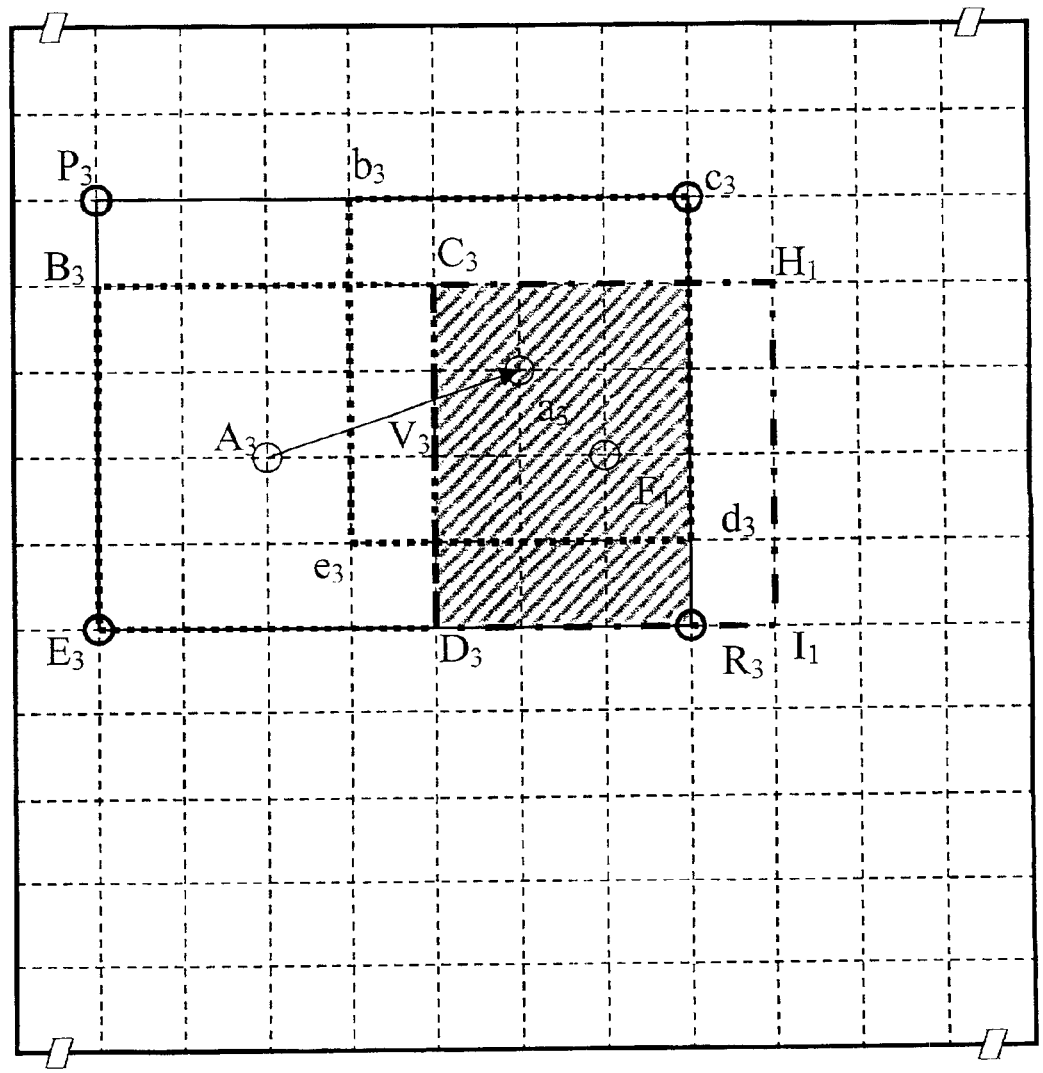
Figure 8D:
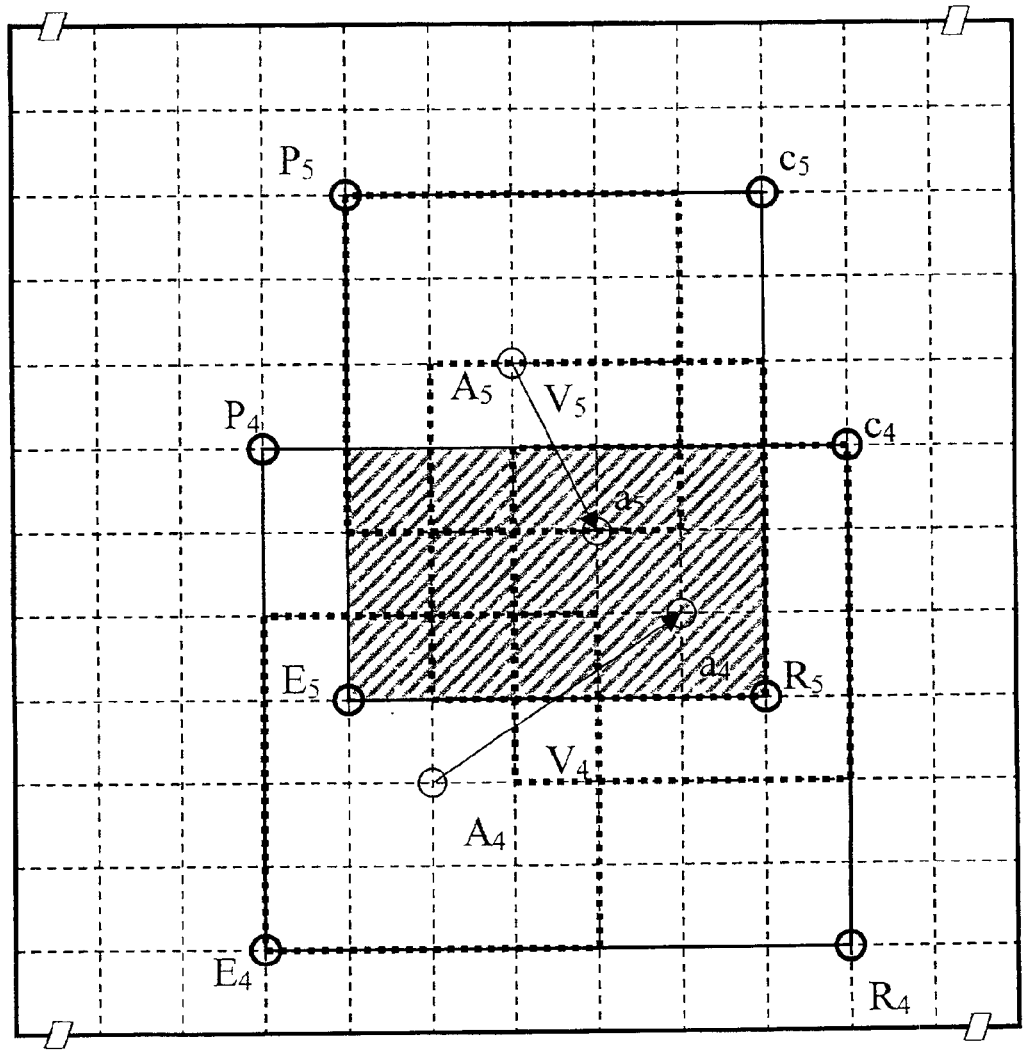

As in FIG. 8B, when there is more than one fixed color, such as "$F_1$" and "$F_2$", the same method is employed to compute colors. When the color tone action space built from the fixed color "$F_2$" goes beyond the boundary of the color space, the extra space is not taken in account. With reference to FIGS. 8C and 8D, no matter whether the color conversion space includes preferred colors or not, the average chromaticity of the new colors is still calculated within the intersection area (the area with oblique lines) as the new color in this area. For example, although the space "$C_3H_1I_1D_3$" includes a preferred color "$a_3$" that is inside the intersection area of the spaces "$P_3c_3R_3E_3$" and "$C_3H_1I_1D_3$", the chromaticity of this fixed color and the chromaticity new color are averaged to obtain the new color for this intersection area. Although the color conversion space "$P_5c_5R_5E_5$" of the preferred color "$a_5$" also includes a preferred color "$a_4$", the method still uses the average chromaticity of the new color in the intersection area of the two color conversion spaces as the new color.

Figure 9:
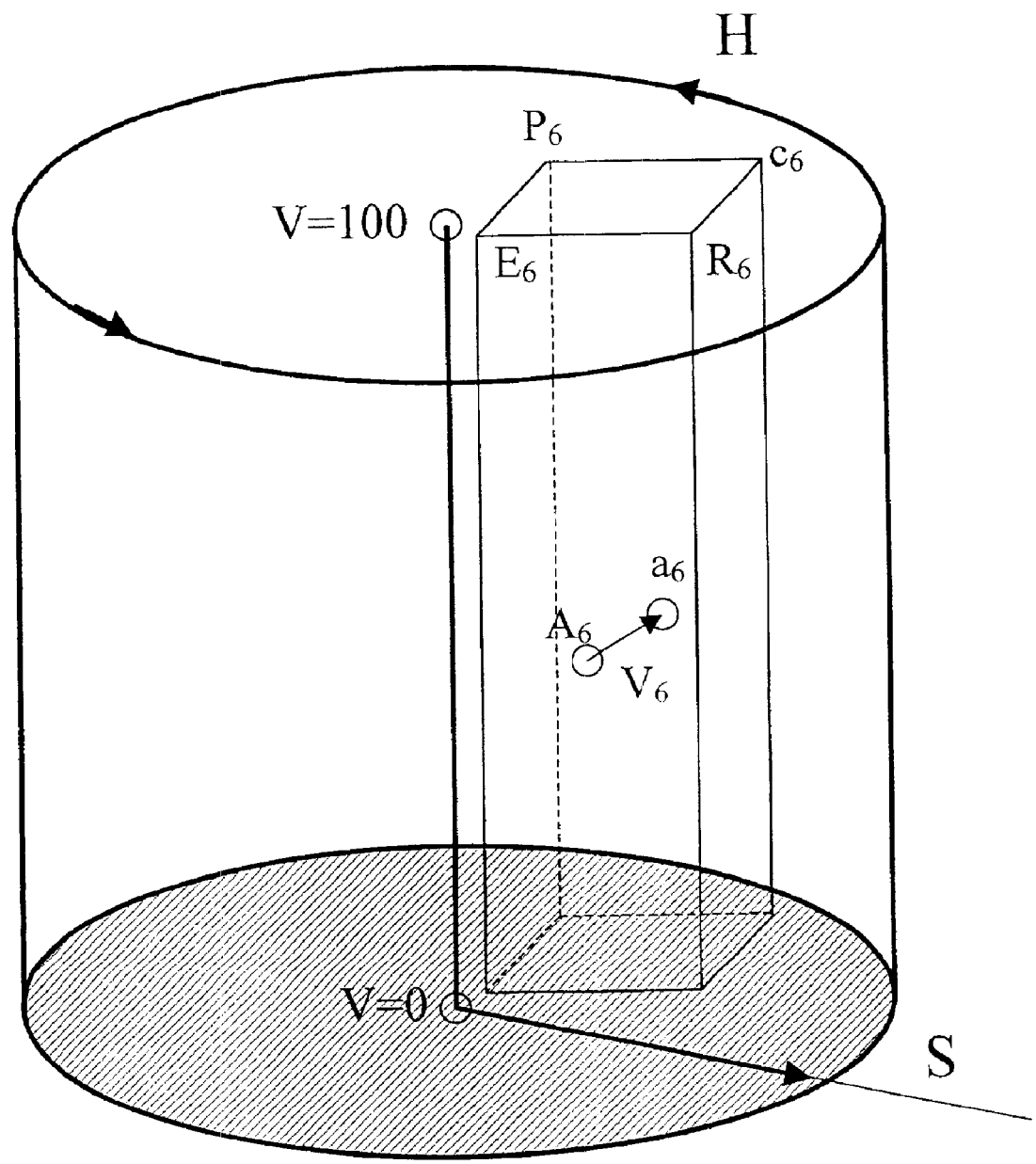
FIG. 9 is a schematic view of the original and preferred colors in the HSV color space.

Despite the fact that the color tone action space uses a selected color as its basic point, the method is not restricted to building the color tone action space with its center on this color. Taking FIG. 9 as an example, in a color space of HSV color system (H: hue, S: saturation, V: brightness) the color tone action space of the selected original color "$A_6$" and the preferred color "$a_6$" can be a cylinder. The long axis of the cylinder covers the whole brightness range. The color conversion space is also a cylinder. The same method as in FIGS. 5 through 8D is used to obtain "$P_6c_6R_6E_6$" in the HS plane, and the V axis has a range from V=0 to V=100. Therefore, when using the selected color to establish the color action space, the space is symmetric in the H and S directions while asymmetric in the V direction.

EFFECTS OF THE INVENTION

The disclosed color conversion method for preferred colors mainly achieves the effect that the selected original color can be accurately converted to the preferred color. The chromaticity variation of converted colors is continuous so that the converted color image looks natural. Since the method only makes color conversions for the colors in the color tone action space, the calculation is much simpler and the method has better control over the color conversion processing. It can effectively increase the color conversion speed for the preferred color tone processing.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A color conversion method for preferred color tones to convert at least one selecting original color in an original color tone image into a preferred color in a preferred color tone, forming a color image with the preferred color tone, the method comprising the steps of:

setting the original color and the preferred color by selecting their chromaticity of a color image in a color space;

establishing color tone action spaces, where the original color and the preferred color are taken as their basic point, respectively, along with a color tone action distance as the range to establish three-dimensional color tone action spaces of the colors;

forming a color conversion space by joining the color tone action spaces of the original color and the preferred color, and determining a vector in the color conversion space from the original color to the preferred color;

making a color conversion in the color conversion space to generate a new color according to the vector; and converting the colors of the color image using the correspondence relation between the original color and the new color, creating the new color image with the preferred color tone.

2. The color conversion method of claim 1, wherein the color tone action space in the step of establishing a color tone action space is selected from a group consisting of rectangular, spherical, cylindrical, elliptical, and polygon space.

3. The color conversion method of claim 1, wherein the step of forming a color conversion space and determining a vector forms the color conversion space with reference to boundaries of the color space.

4. The color conversion method of claim 1, wherein the step of making a color conversion to generate a new color makes the color conversion through interpolation and color tone adjustment in the color space.

5. The color conversion method of claim 1, wherein when there is a plurality of the selecting original colors and the preferred colors the step of making a color conversion to generate a new color is followed by the steps of:

confirming that the intersection among the color conversion spaces is occurred; and calculating the new color in the intersection area.

6. The color conversion method of claim 5, wherein the new color in the step of calculating the new color in the intersection area is an average one calculated from the new colors of the intersection area of each color conversion spaces.

7. The color conversion method of claim 1, wherein when there is a plurality of the original colors and the preferred colors and one of the original color is the same as one of the preferred color, the two color tone action spaces established from the original color and corresponding preferred color are the same and the vector is a null vector in the color conversion space.

* * * * *